(12) United States Patent
Christ

(10) Patent No.: US 7,353,919 B2
(45) Date of Patent: Apr. 8, 2008

(54) COOLING ARRANGEMENT FOR BRAKE CALIPER

(75) Inventor: Joachim Christ, Neuwied (DE)

(73) Assignee: Alcon Components Limited, Tamworth (GB)

( * ) Notice: Subject to any disclaimer, the term of this patent is extended or adjusted under 35 U.S.C. 154(b) by 106 days.

(21) Appl. No.: 10/501,619

(22) PCT Filed: Jan. 14, 2002

(86) PCT No.: PCT/GB02/00140

§ 371 (c)(1),
(2), (4) Date: May 25, 2005

(87) PCT Pub. No.: WO03/058088

PCT Pub. Date: Jul. 17, 2003

(65) Prior Publication Data

US 2005/0284708 A1   Dec. 29, 2005

(51) Int. Cl.
*F16D 55/02*   (2006.01)
(52) U.S. Cl. .................. 188/71.6; 188/264 A
(58) Field of Classification Search .......... 188/71.6, 188/218 XL, 264 A, 264 AA, 264 R
See application file for complete search history.

(56) References Cited

U.S. PATENT DOCUMENTS 3,047,105 A * 7/1962 Schwartz ............. 188/264 D
3,592,298 A   7/1971 Leffert et al.
3,664,467 A   5/1972 Lucien et al.
3,983,974 A  10/1976 Dowell et al.
4,440,270 A   4/1984 Ross
5,002,160 A   3/1991 Weiler et al.
5,238,090 A   8/1993 Weiler

FOREIGN PATENT DOCUMENTS

| DE | 1913910 | 4/1965 |
| DE | 1903437 | 8/1970 |
| DE | 3833552 | 10/1988 |
| DE | 10034364 | 2/2002 |
| FR | 1548561 | 12/1968 |
| GB | 931452 | 7/1963 |
| GB | 2214581 | 9/1989 |
| JP | 62067337 | 3/1987 |
| JP | 02159431 A * | 6/1990 |
| WO | WO 8301664 | 5/1983 |

* cited by examiner

*Primary Examiner*—Xuan Lan Nguyen
(74) *Attorney, Agent, or Firm*—Barnes & Thornburg LLP

(57) ABSTRACT

The invention relates to a brake caliper with at least one axially displaceable, hydraulically actuated piston (1), with which a brake pad (8) can be pressed against a brake disc (9). The brake caliper is characterized in that the piston (1) defines a cavity with at least one inlet opening (12) for feeding a cooling medium into the cavity and an outlet opening (11) for discharging the cooling medium from the cavity. The inlet opening is spaced from the brake pad (8) and the outlet opening is arranged adjacent the pad (8).

17 Claims, 4 Drawing Sheets

COOLING ARRANGEMENT FOR BRAKE CALIPER

Figure 1:
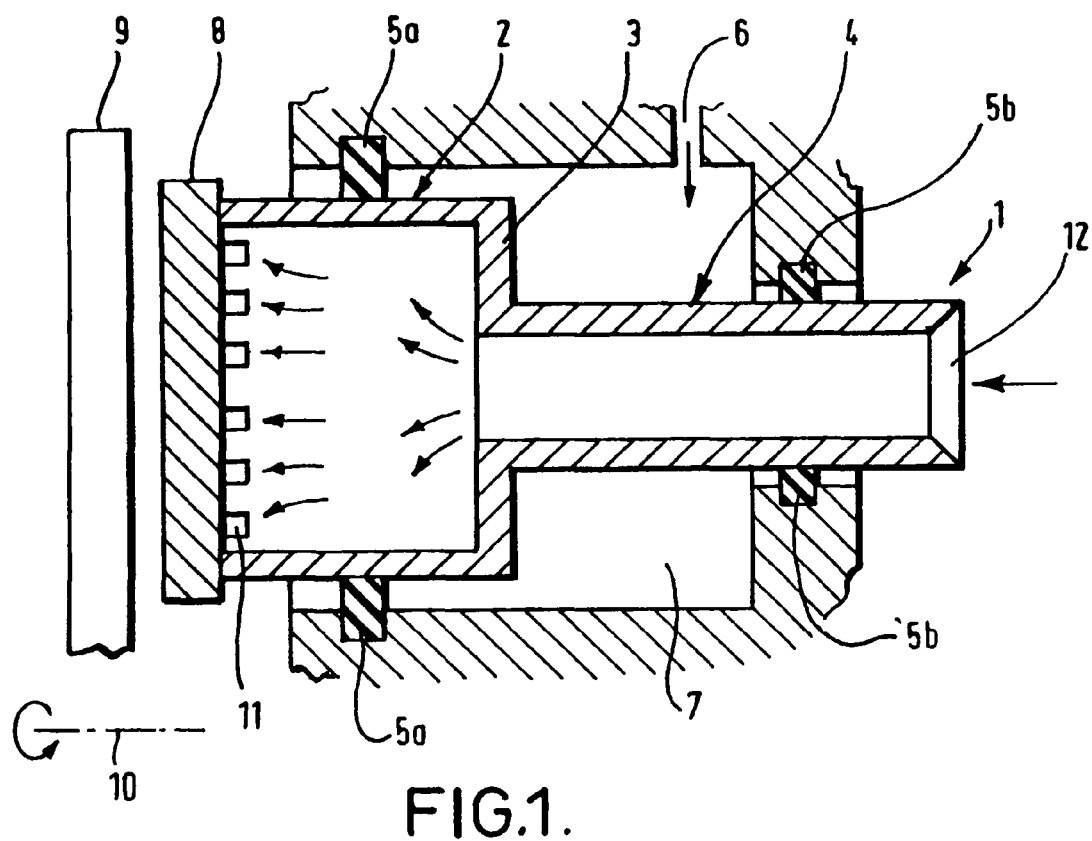

The invention relates to a brake caliper with at least one axially displaceable, hydraulically actuated piston, with which at least one brake pad can be pressed against a brake disc, a piston for use with such a caliper and a brake pad for use with such a caliper.

In a brake caliper, friction linings or "brake pads" are, during the braking operation, pressed axially against the brake disc rotating with the wheel of a vehicle. The resultant friction converts rotational energy into heat. The heat generated causes an increase in the temperature of the brake disc, the brake pads and the brake caliper. Thermal conduction and thermal radiation also heat the piston, the hydraulic fluid, the space accommodating the hydraulic fluid and the seals that isolate the hydraulic fluid from the environment.

The combination of brake disc and pad is cooled in order to dissipate the heat generated by a braking operation. In many cases, the temperature gradient between the heated components and the environment is sufficient for heat dissipation. Greater cooling can be achieved if the heated components are exposed to an air current. Internally ventilated disc brakes are one example of this.

This cooling primarily removes heat from the brake disc and the pads. This heat dissipation leads to lower pad temperatures, which also results in lower temperatures of the piston, in the hydraulic fluid and in the seals.

Sufficient cooling of the combination of brake disc and pad or pads makes it possible to keep the maximum temperatures occurring on the brake disc and oh the pads below certain limits. However, this cannot rule out the possibility of temperatures arising on the piston at which reliable actuation and functioning of the brake is no longer guaranteed.

If, for example, the seals that isolate the environment from the hydraulic fluid are exposed to excessive temperatures, there is a risk of them becoming leaky. These leaks can, on the one hand, lead to the escape of brake fluid. On the other hand, air can enter the brake fluid through a leaky seal, which should also be avoided.

The brake fluid must also not be exposed to excessively high temperatures. If, as a result of excessive heat input, the temperature of the brake fluid rises beyond its boiling point, bubbles are formed as a result of boiling. Under these circumstances, it is no longer possible to build up a controlled pressure in the brake fluid. The brake can no longer be operated reliably.

The object of the invention is thus to create a device with which the temperature can be kept low, especially in the region of the piston of a disc brake caliper.

According to one aspect of the invention, this object is solved in that the piston defines a cavity with at least one axially displaceable, hydraulically actuated piston, with which a brake pad can be pressed against a brake disc, the piston defining a cavity with at least one inlet opening for feeding a cooling medium into the cavity, the inlet opening being arranged in the piston spaced away from the brake pad, and at least one outlet opening arranged in the piston adjacent to the brake pad for discharging cooling medium from the cavity.

The piston can be cooled by the cooling medium entering the cavity of the piston through the inlet opening. The cooled piston surfaces also cool the seals and the hydraulic fluid. This makes it possible to influence the temperature of the piston, the brake fluid and the seals, as well as of other components in the direct vicinity of the piston. As a result, the temperature of the hydraulic fluid can be kept within a normal range, even at very high energy input.

The cooling medium used is preferably air or another suitable cooling medium. The flow of the medium through the piston can be influenced by setting a pressure upstream of the inlet opening.

This invention results in a main direction of cooling medium flow through the piston that is directed at the pad or pads. The pad is also cooled by the cooling medium flowing against it. However, heat is also removed from the pad by the thermal conduction between the friction lining and the cooled piston.

Suitable devices, such as deflectors within the piston cavity, can be used to influence the cooling medium flow. As a result, the cooling medium can be directed to the points of the piston requiring particular cooling. The areas of the piston that run over the seals can be mentioned as an example in this context. In particular, the piston walls that are in direct contact with the hydraulic fluid to be cooled can also be cooled in this way.

The piston preferably comprises two hollow, coaxial cylinders of different diameters. In this context, the pad pressed against the brake disc by the piston is located on a face end of the cylinder with the larger diameter.

The face end of the cylinder with the larger diameter that faces away from the pad can lie in the plane of the face end of the cylinder with the smaller diameter that faces the pad. In this context, the piston wall extends in the plane perpendicular to the cylinder axis only from the lateral surface of the cylinder with the larger circumference to the lateral surface of the cylinder with the smaller diameter. As a result, the two hollow cylinders form an undivided cavity. The annular piston wall between the lateral surfaces of the cylinders is pressurised so that the piston can be pressed against the brake disc along with the pad.

An opening, through which the cooling medium enters the piston cavity, can be provided on the face end of the cylinder with the smaller diameter that faces away from the pad. In this case, the cooling medium then flows through the cylinder with the smaller diameter into the cylinder with the larger diameter.

In another practical example, the piston can comprise one cylinder, where the pad is located on one face end of the cylinder. A circular opening can be provided in the other face end of the cylinder, the centre of the circle of which is located on the axis of the cylinder. A flow-through device can extend through this opening. The cooling medium can enter the piston cavity through this flow-through device, which can be designed as a section of pipe.

There can be a multiplicity of openings at the edge of the face end of the cylinder facing the pad, on which the pad is located. The openings can be arranged around the circumference of the cylinder at regular intervals.

According to another aspect of the invention there is provided a brake caliper piston for use in a brake caliper for pressing a brake pad against a brake disc, the piston defining a cavity and having a first end, an inlet opening for feeding cooling medium into the cavity in or adjacent to the first end and a second end arranged to press against a brake pad and an outlet opening in or adjacent to the second end, the first end being spaced from the second end.

According to a further aspect of the invention there is provided a brake pad for use in a brake caliper, the brake pad having a surface against which a piston of a caliper can be arranged to press, the surface having a cooling medium passageway formed therein arranged to receive cooling medium from the piston and to duct the medium away from the piston.

Figure 2:
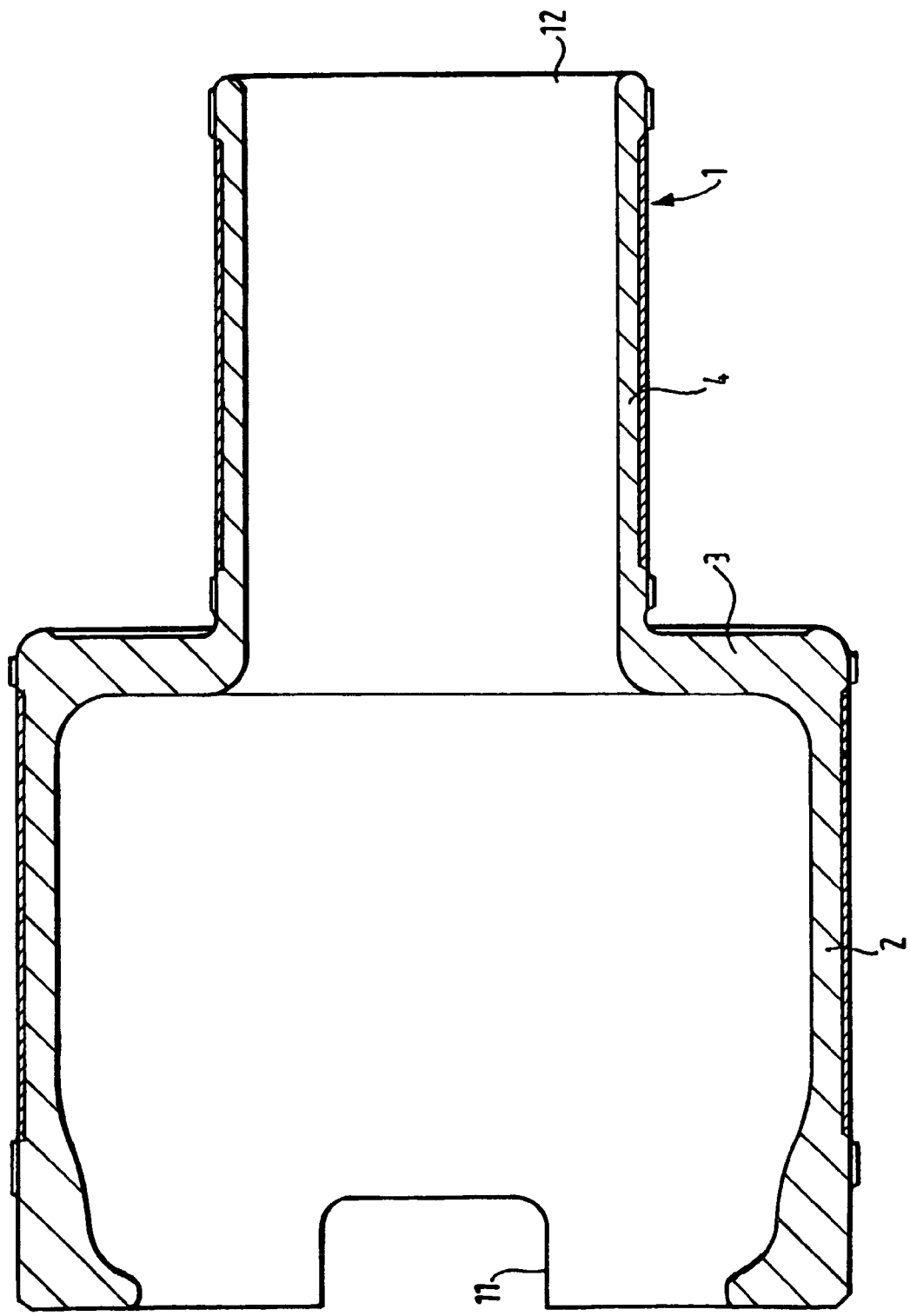
Figure 3:
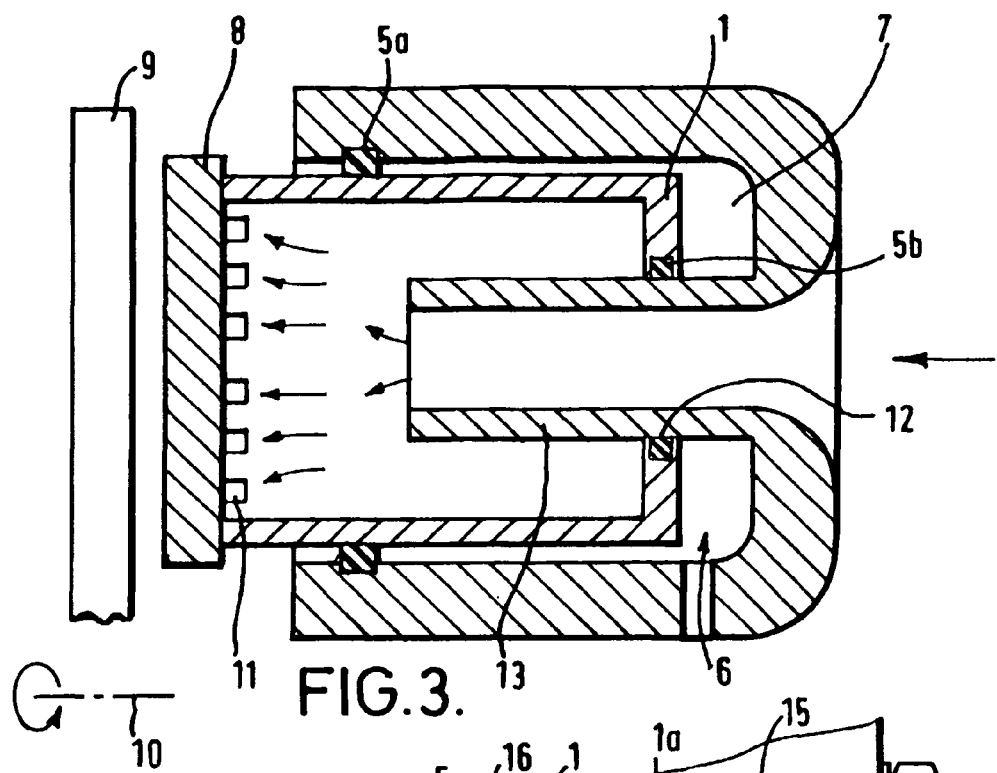
Figure 4:
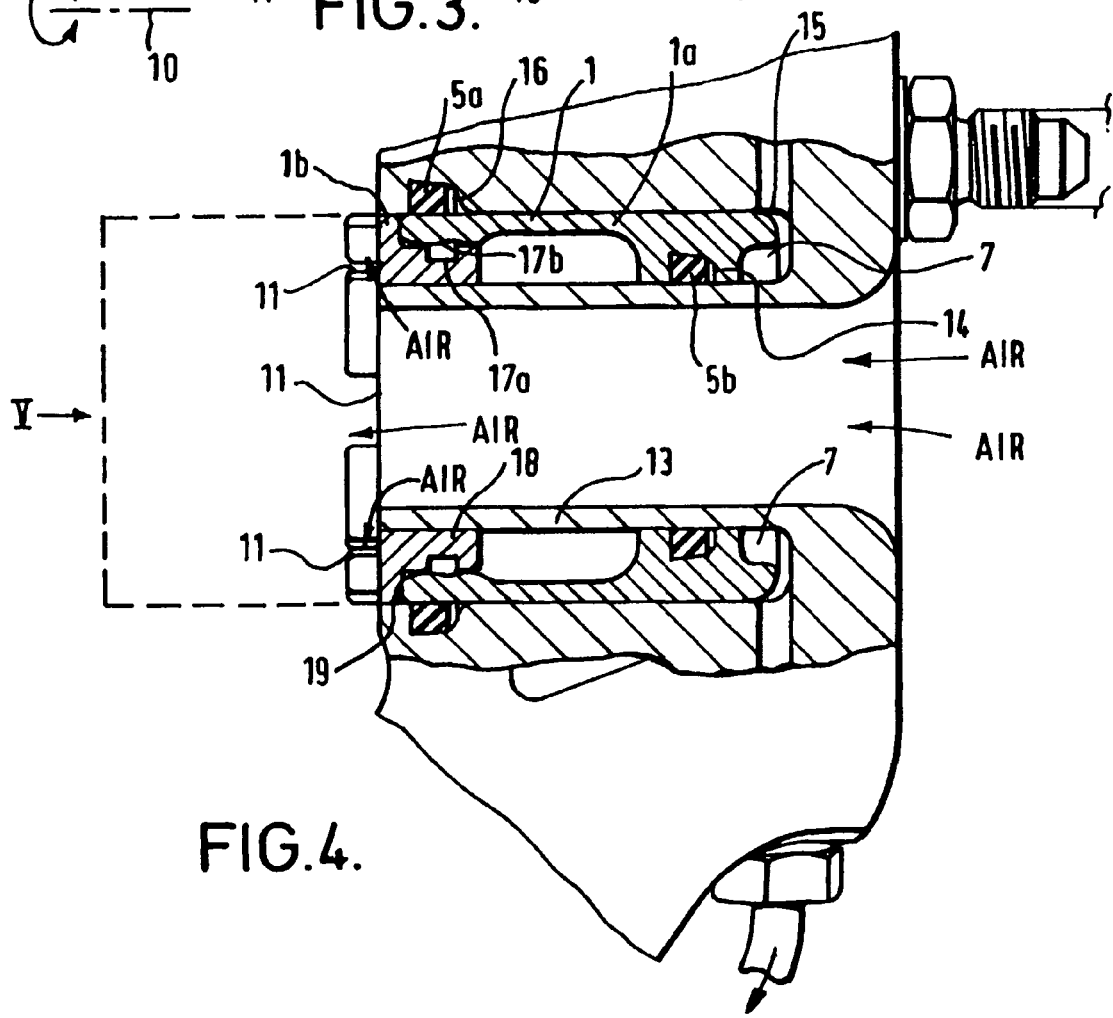
Figure 5:
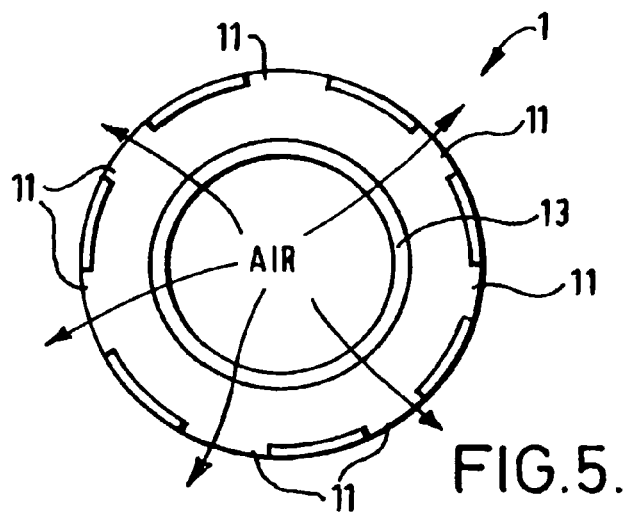
Figure 6:
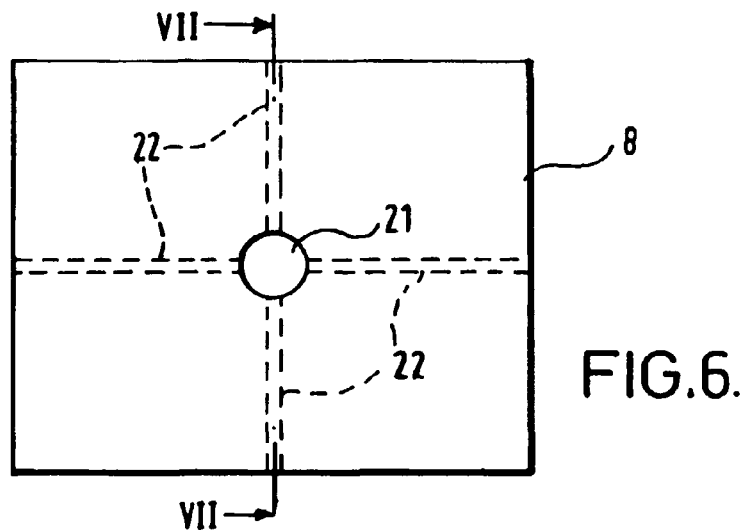
Figure 7:
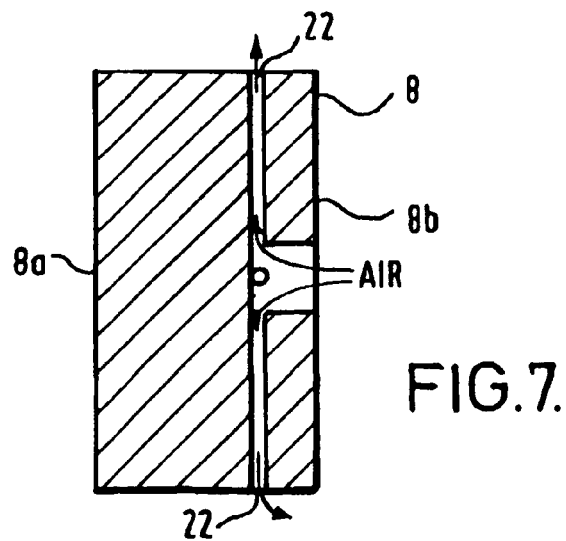

Brake calipers, pistons and brake pads in accordance with the invention will now be described in more detail below with reference to the accompanying drawings, in which:

FIG. 1 is a schematic representation of a longitudinal section of one brake caliper in accordance with the invention, FIG. 2 is a longitudinal section of a piston in accordance with the invention for use in the caliper of FIG. 1, FIG. 3 is a schematic representation of a longitudinal section of a second brake caliper in accordance with the invention, FIG. 4 is a longitudinal section of a third brake caliper in accordance with the invention, FIG. 5 is an elevation of the caliper of FIG. 4 looking in the direction of arrow V in FIG. 4, FIG. 6 is an elevation of the rear of a brake pad in accordance with the invention for use with a caliper and piston in accordance with the invention, and FIG. 7 is a section of the brake pad of FIG. 6 taken on line VII-VII in FIG. 6.

Piston 1 shown in FIG. 1 comprises two hollow cylinders 2 and 4, the lateral surfaces of which are connected by annular piston wall 3. Interior space 7, which accommodates the hydraulic fluid and into which the hydraulic fluid passes through opening 6, is sealed off from the environment by annular seals 5a and 5b.

Piston 1 with pad 8 is pressed against brake disc 9 by building up pressure in interior space 7. The frictional forces between pad 8 and brake disc 9 decelerate brake disc 9, which rotates about axis of rotation 10.

Provided in the face end of cylinder 4 with the smaller diameter that faces away from the pad is inlet opening 12, which extends over the entire face end. The cooling medium flows through inlet opening 12 into the cavity of piston 1. Several slit-type outlet openings 11 are provided on the face end of the cylinder 2 with the larger diameter, on which pad 8 is located. The cooling medium, preferably air, flows out of the cavity of piston 1 through these outlet openings 11.

Optionally, the air flowing out of the cavity through the outlet openings 11 impinges on the brake disc 9 to provide further cooling by convection.

The piston 1 in FIG. 2 is substantially the same as that shown in FIG. 1 and parts corresponding to parts in FIG. 1 carry the same reference numerals.

As shown in FIG. 2, the outlet opening 11 at the pad end of the piston 1 is wider than the slit-like openings of FIG. 1. In the FIG. 2 embodiment, two such openings are provided. One, three or more openings may be provided in the alternative.

In another embodiment (not shown), the piston 1 does not have the openings 11 but is open at both ends thereof. In that case the piston 1 abuts the brake pad 8 shown in FIGS. 6 and 7 described in more detail below.

FIG. 3 shows a longitudinal section of another practical example according to the invention. The hydraulic fluid enters interior space 7, which accommodates the hydraulic fluid, through opening 6. Piston 1 is of cylindrical shape, where pad 8 is located on one face end. A flow-through device 13, in the form of a section of pipe like a chimney through which the cooling medium flows into the cylinder-shaped piston, passes through inlet opening 12. Provided between the section of pipe and the inlet opening is an annular seal 5b, which separates the piston cavity from interior space 7, in which the brake fluid is located. Several slit-type outlet openings 11 are provided on the edge of the face end on which pad 8 is located. In addition, an annular seal 5a is located between the peripheral surface of the cylinder forming the piston and the wall of interior space 7.

Instead of slit-like openings, the openings 11 may be formed by drilling holes through the wall of the piston adjacent the pad 8.

The caliper illustrated in FIG. 4 is similar to that in FIG. 3 and parts corresponding to parts in FIG. 3 carry the same reference numerals.

As in FIG. 3, the piston 1 in FIG. 4 is cylindrical and a chimney-like flow through device 13 extends from the wall of the caliper into the interior space of the piston 1.

In FIG. 4, the piston 1 is formed in two pieces 1a, 1b. The first piston piece 1a is a hollow cylinder with an annular channel 14 formed on the inner surface thereof. The channel 14 is arranged to receive the annular seal 5b which seals against the outer surface of the flow through device 13.

The annular channel 14 protrudes slightly from the inner wall of the hollow piston 1 and is arranged slightly in from one end of the piston so as to define an interior space 7 into which hydraulic fluid can enter from the brake fluid reservoir (not shown).

The piston 1 is slidable in a bore 15 and the outer wall of the piston 1 is sealed against the bore 15 by means of an annular seal 5a formed in an annular channel 16 in the bore 15 adjacent the mouth thereof.

The second piston piece 16 comprises an end cap which is secured to the first piston piece 1a at the end spaced from the inner annular channel 14 by means of a ring (not shown) in co-operating annular grooves 17a, b around the end cap 1b and on the inner surface of the first piston piece 1a. The end cap 1b is fixed to the first piston piece 1a so that they move together as a unit. The end cap 16 is provided as an additional thermal barrier.

The end cap 1b comprises a cylindrical portion 18 which extends into the hollow interior of the first piston piece 1a from the end thereof spaced from the annular channel 14. The end cap 1b further comprises an annular shoulder portion 19 which extends outwardly of the cylindrical portion 18 and against which the end of the first piston piece 1a abuts. Extending from the periphery of the shoulder portion 18 in the axial direction of the piston 1 is a plurality of regularly spaced crenellations 20 which define spaces therebetween. The spaces between the crenellations constitute the aforesaid outlet openings 11. The profile shown in broken lines in FIG. 4 represents the extent of maximum piston travel. The tips of the crenellations, in use, abut the rear surface of a brake pad 8 (not shown). The hydraulic brake fluid is supplied under pressure to the space 7 which serves to push the piston 1 axially out of the bore 15, pushing the pad 8 against the brake disc 9 (not shown). Air is supplied under pressure through the flow through device 13, which serves to cool the interior of piston 1. The air flows through the piston 1, strikes the rear surface of the pad 8 (not shown) and escapes from the piston 1 through the openings 11 between the crenellations 20.

In an alternative embodiment, either of the FIG. 2 piston or the FIG. 4 arrangement, the outlet openings 11 in the side wall of the piston 1 or between the crenellations 20 respectively can be omitted. In such a case, the air outlet from the piston preferably comprises the open end of the piston 1. The end face of the piston 1 which abuts the rear surface of the brake pad 8 is preferably smooth so as to abut the pad flush against the rear surface thereof. In such an embodiment, the pad 8 is as shown in FIGS. 6 and 7.

The pad 8 shown in FIGS. 6 and 7 is shown rectangular in shape for simplicity but any pad shape is envisaged. The pad 8 has front surface 8a which is arranged to be pressed against the brake disc 9, in use. The pad 8 further includes a rear surface 8b against which the piston 1 abuts. A blind bore 21 is formed in the pad so as to lie generally centrally of the piston axis, extending from the rear surface 8b, perpendicular thereto, part of the way into the pad 8 (see FIG. 7).

Coolant flow passageways 22 are formed extending radially outwardly from the bore 21 in fluid communication therewith. Each passageway 22 extends from the bore 21 to the peripheral edge of the pad 8. In the embodiment illustrated, four coolant flow passageways 22 are provided at regular angular intervals. Alternatively radial grooves may be formed in the rear surface by machining.

In use, the piston 1 abuts the rear surface 8b of the pad 8 and presses the front surface 8a against the disc 9 which generates frictional heat.

The coolant air flows through the piston 1 as described above in relation to FIGS. 2 and 4. However, instead of escaping through outlet openings 11 in the piston 1, the air passes into the bore 21 and through the passageways 22 to atmosphere, thus cooling the pad 8 by convection in addition to the piston 1.

In the above embodiments, the coolant flow through the piston is regulated by controlling the pressure of the coolant upstream of the piston 1. For example, where the coolant is air, a compressor (not shown) may be provided to pump air through the piston at variable pressures. Alternatively, ambient air may be drawn from atmosphere and directed through the piston, for example by means of an air scoop which scoops ambient air as the vehicle travels through it and ducting to duct the air to the brake caliper. Optionally a regulator valve may be provided upstream of the caliper to regulate incoming air pressure or the scoop aperture may be varied in size depending upon cooling requirements.

The invention claimed is:

1. A brake caliper having a caliper wall, the caliper wall defining a cylinder with at least one axially displaceable, hydraulically actuated piston received in the cylinder, with which a brake pad can be pressed against a brake disc, the piston defining a cavity therewithin, with at least one inlet opening for feeding air into the cavity, the inlet opening being arranged in the piston spaced away from the brake pad, and at least one outlet opening arranged in the piston adjacent to the brake pad for discharging air from the cavity to adjacent the brake pad, characterized in that air flows through the caliper wall into the cavity of the piston to allow passage of air from outside the caliper wall to the cavity whereby the discharging air cools one of the brake pad and brake disc by convection.

2. A brake caliper according to claim 1, characterized in that a flow through device is integral with the wall of the brake caliper.

3. A brake caliper according to claim 1, characterized in that the piston comprises a hollow cylinder having a pair of face ends, wherein the brake pad is located on one of the face ends and an inlet opening, through which air flows, is defined on the other face end, the inlet opening being coaxial to the cylinder.

4. A brake caliper according to claim 3, characterized in that the at least one outlet opening comprises several slit-type outlet openings on an edge of the face end on which the brake pad is located.

5. A brake caliper according to claim 1, characterized in that the piston is formed of two pieces.

6. A brake caliper according to claim 5, characterized in that a first piston piece is a hollow cylinder with an annular channel formed on the inner surface thereof.

7. A brake caliper according to claim 6, characterized in that the annular channel is arranged to receive an annular seal which seals against the outer surface of a flow through device which extends from the caliper wall into the cavity.

8. A brake caliper according to claim 6, characterized in that the second piston piece comprises an end cap which is secured to the first piston piece at the end spaced from the inner annular channel by means of a ring in co-operating annular grooves around the end cap and on the inner surface of the first piston piece.

9. A brake caliper according to claim 1, characterized in that the outlet openings are located at regular intervals at the edge of the face end of the cylinder on which the friction lining is located, or openings are drilled through the wall of the piston adjacent the pad.

10. A brake caliper according to claim 1, characterized in that the discharging air impinges on the brake disc.

11. A brake caliper according to claim 1, characterized in that the discharging air is directed at and flows against the brake pad.

12. A brake caliper according to claim 1, characterized in that the piston comprises a hollow cylinder having a pair of face ends, wherein the brake pad is located on one of the face ends and an inlet opening, through which a flow-through device extends, is defined on the other face end, and the at least one outlet opening comprises several openings around the circumference of the hollow cylinder.

13. A brake caliper according to claim 12, characterized in that the several openings are arranged at regular intervals around the circumference of the hollow cylinder.

14. A brake caliper according to claim 1, characterized in that the inlet opening connects to a bore in the brake pad so that air passes from the inlet opening through the bore in the brake pad and exits through at least one outlet opening.

15. A brake caliper according to claim 1, characterized in that the hydraulically actuated piston has a first surface that is contacted by hydraulic fluid causing piston movement and a second surface that contacts and forms a passage for the cooling air.

16. A brake caliper according to claim 1, characterized in that the hydraulic fluid does not pass through the inlet opening and does not pass through the at least one outlet opening.

17. A brake caliper according to claim 1, characterized in that the hydraulic fluid is operable on the outside of the piston and the air passes through the inlet opening, the cavity of the piston and through the at least one outlet opening.

* * * * *